United States Patent [19]
Cohen-Solal

[11] Patent Number: 5,933,518
[45] Date of Patent: Aug. 3, 1999

[54] METHOD AND DEVICE FOR IMAGE PROCESSING FOR AUTOMATICALLY DETECTING OBJECTS IN DIGITIZED IMAGES

[75] Inventor: Eric Cohen-Solal, Garges-les-Gonesse, France

[73] Assignee: U.S. Philips Corporation, New York, N.Y.

[21] Appl. No.: 08/636,212

[22] Filed: Apr. 22, 1996

[30] Foreign Application Priority Data

Apr. 20, 1995 [FR] France .................................. 95 04738

[51] Int. Cl.⁶ ..................................................... G06K 9/00
[52] U.S. Cl. .............................. 382/132; 378/37; 378/62; 382/173; 382/260
[58] Field of Search ...................... 345/137; 364/724.011, 364/724.013, 724.014, 724.05, 724.11, 728.01; 378/62, 37; 382/128–133, 173, 257, 260, 261, 264–266, 276, 279, 307, 308, 103, 141, 148, 149; 342/159, 162

[56] References Cited

U.S. PATENT DOCUMENTS

| | | | |
|---|---|---|---|
| 4,644,585 | 2/1987 | Crimmins et al. | 382/283 |
| 5,347,594 | 9/1994 | Grimaud | 382/207 |
| 5,365,429 | 11/1994 | Carman | 364/413.13 |
| 5,452,367 | 9/1995 | Bick et al. | 382/128 |
| 5,577,131 | 11/1996 | Oddou | 382/173 |

OTHER PUBLICATIONS

Verhoeven et al., Improvement of Lesion Detectability by Speckle Reduction Filtering: A Quantitative Study, Ultrasonic Imaging, vol. 15, No. 3, p. 181–204, Jul. 1993.
Pratt, William K., Digital Image Processing, John Wiley & Sons, p. 482, 1978.
Kim and Kim, A Count–Dependent Reconstruction Filter Optimized to Match the Lesion Size and the Object Contrast in SPECT, Transactions on Nuclear Science, vol. 42, No. 4, Aug. 1995.
"Multiresolutional Analysis of Ridges and Valleys in Grey-–Scale Images" J. Gauch et al, IEEE Transactions on Patterns Analysis and Machine Intelligence, vol. 15, No. 6, Jun. 1993.

*Primary Examiner*—Amelia Au
*Assistant Examiner*—Marc Bobys
*Attorney, Agent, or Firm*—Dwight H. Renfrew, Jr.

[57] ABSTRACT

An image processing method is for automatically detecting objects of a predetermined type among diffuse objects in an original image, in the form of a two-dimensional matrix of pixels which have digitized intensity values. The method is carried out by a processing chain. A first transformed image (11A, 11B) is formed by a first smoothing (120A, 120B) of the original image (10A) to the resolution of the objects to be detected, in which local intensity optimums (LIST1A, LIST1B) are determined (130A, 140A; 130B, 140B). A second transformed image (13A, 13B) is formed via a second smoothing (220A, 220B) of the original image (10A) to the resolution of diffuse objects, in which homogeneous intensity regions are determined (230A, 230B), local intensity optimums (LIST1A, LIST1B) determined on the basis of the first transformed image are placed (240A, 240B) in the homogeneous regions determined on the basis of the second transformed image. One of these optimums per homogeneous region is selected (LIST2A, LIST2B), and objects among these optimums are additionally selected which constitute a list (LIST3A, LIST3B) of objects of a given type detected in the original image. The method is applicable to automatic recognition of suspect regions in radiologic images.

20 Claims, 14 Drawing Sheets

14A

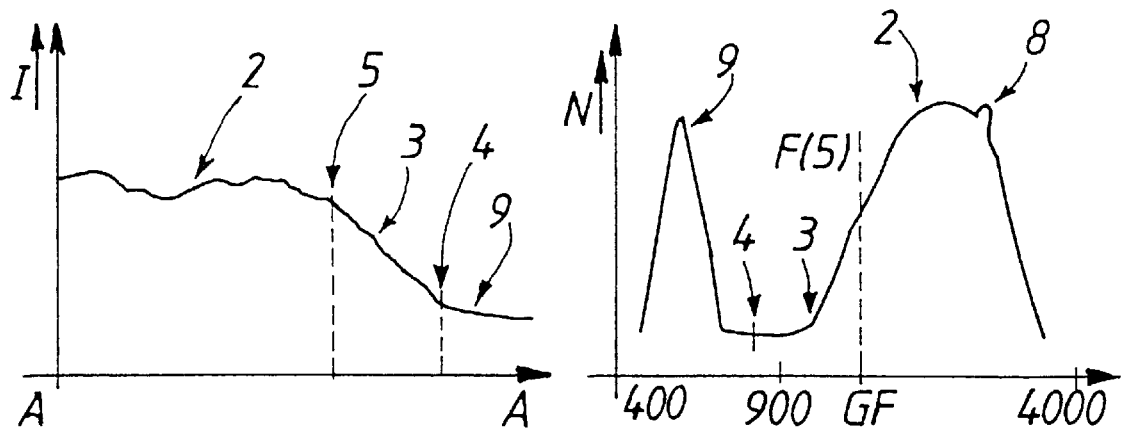
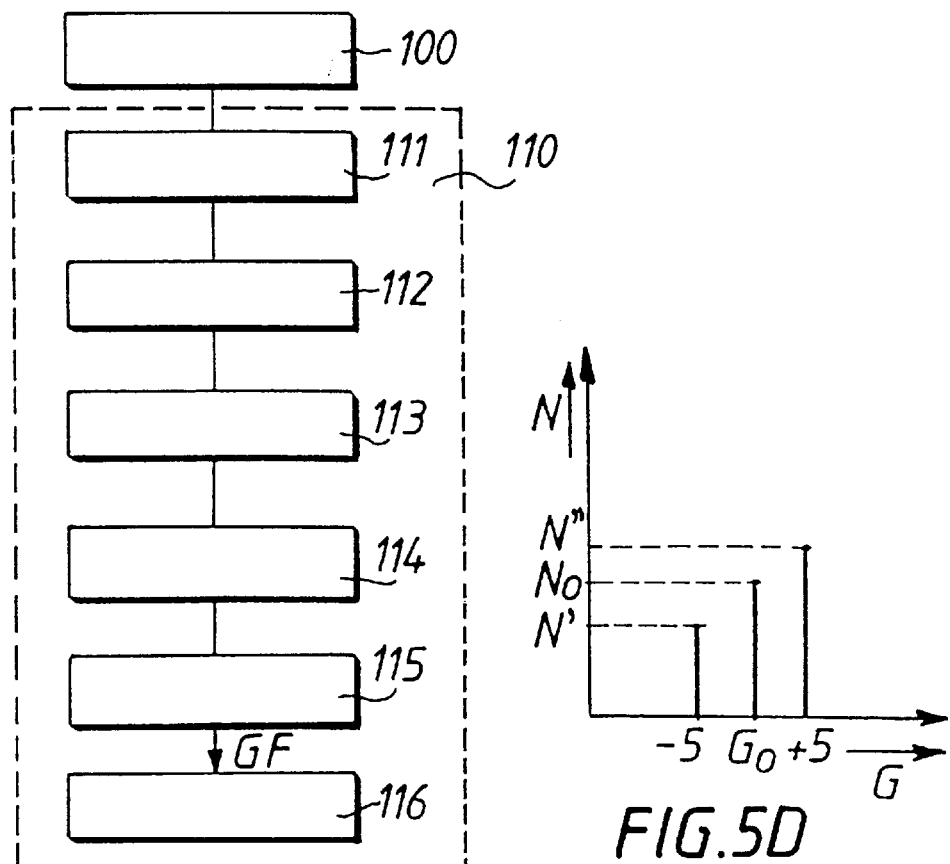

METHOD AND DEVICE FOR IMAGE PROCESSING FOR AUTOMATICALLY DETECTING OBJECTS IN DIGITIZED IMAGES

BACKGROUND OF THE INVENTION

1. Field of the Invention

The invention relates to a method of image processing for automatically detecting objects of a given type among diffuse objects in an image called original image in the form of a two-dimensional pixel matrix which has digitized intensity values.

The invention likewise relates to a device for implementing this method.

The invention particularly finds its application in the field of radiology for automatically recognizing suspect opacities of a given type in the mammographies, which type corresponds to specific potential cancers.

2. Description of the Related Arts

From the state of the art is already known an image processing method entitled "Multiresolution Analysis of Ridges and Valleys in Grey-Scale Images", published by S. M. GAUCH and S. M. PIZER, published in IEEE TRANSACTIONS ON PATTERNS ANALYSIS AND MACHINE INTELLIGENCE, Vol. 15, No. 6, June 1993. This publication particularly describes a method of detecting ridges and valleys in a three-dimensional image, by searching for the dividing lines of rainfall and the lowest points of the watershed regions of the drainage on the slopes from the ridges. This geographical concept is applied to the two-dimensional images in which intensity levels of the pixels are introduced, or grey levels as a third dimension. According to the described method, the watershed regions and their boundaries are calculated for each image. Thereafter, a hierarchy is imposed on these regions by following the intensity extremes which define each watershed region through multiple resolutions. Then, this hierarchy is used for associating an elimination scale with each boundary curve segment of the watershed region. Finally, a resolution hierarchy is defined with respect to the boundaries of the watershed regions.

SUMMARY OF THE INVENTION

The present invention proposes to provide a method and a device for automatically detecting suspect opacities in digitized radiological images and notably in mammographical images.

The present invention particularly proposes to provide such a method and such a device for carrying out this automatic detection in a single image, or also image-by-image, without taking account of a previously established database.

A particular object of the invention is to provide such a method and such a device for automatically detecting suspect opacities of very small dimensions, of the order of 4 to 5 mm in diameter.

Another particular object of the invention is to provide such an automatic detection device for these zones, which is associated to the special radiology equipment suitable for producing mammographies.

The processing of the mammographic images for automatically detecting suspect opacities poses a large number of problems.

These problems are linked, in essence, with the variability of the objects present in the images to be processed. The variability of the objects to be processed is due, on the one hand, to the diffuse aspect of the tissues which form the major part of the radiographed organ, and, on the other hand, to the fact that mammography is the projection of a three-dimensional image of an organ whose thickness is not constant; these variable opacities of diverse origin may mask suspect opacities which have equally variable form and small diameter which are exactly the ones one seeks to detect.

In consequence, a method of detecting suspect opacities in a mammography is to take all the information signals contained in the image into account, cannot allow itself to exclude objects a priori, and must be particularly robust.

It is an object of the invention to provide an automatic detection method based on a single photograph of all the real suspect zones and by excluding the maximum of wrongly detected zones.

This object is achieved by an image processing method of automatically detecting objects of a given type among diffuse objects in an image, called original image, in the form of a two-dimensional pixel matrix with digitized intensity values, this method comprising in the form of a processing system, steps which include:

a first smoothing of the original image to the resolution of the objects to be detected, to produce a first transformed image, determining local intensity optimums based on said first transformed image, a second smoothing of the original image to the resolution of diffuse objects, to produce a second transformed image, determining regions of homogeneous intensity based on the second transformed image, placing local intensity optimums determined on the basis of the first transformed image, in the homogeneous regions determined on the basis of the second transformed image, and selecting one of these optimums per homogeneous region, forming a list of objects among the selected intensity optimums, which constitutes a list of the objects of a given type detected in the original image.

An auxiliary device for visualizing medical images comprises:

a system for producing data of a medical image of a part of the human body in the form of a two-dimensional pixel matrix with digitized intensity values, an image display system, and a processing system including a processor which has an access to the image data and to the display system for implementing an image processing method for automatically detecting objects of a given type among diffuse objects, in said image called original image in the form of a two-dimensional pixel matrix with digitized intensity values, this method comprising in the form of a processing chain, steps including:

a first smoothing of the original image to the resolution of the objects to be detected, to produce a first transformed image, determining local intensity optimums on the basis of said first transformed image, a second smoothing of the original image to the resolution of the diffuse objects, to produce a second transformed image, determining homogeneous intensity zones on the basis of the second transformed image, placing the local intensity optimums determined on the basis of the first transformed image, in the homogeneous zones determined on the basis of the second transformed image, and selecting one of these optimums per homogeneous zone, forming a list of objects from the selected intensity optimums, which constitutes a list of the objects of a given type detected in the original image.

BRIEF DESCRIPTION OF THE DRAWINGS

These and other aspects of the invention will be apparent from and elucidated with reference to the embodiments described hereinafter.

In the drawings:

FIG. 5A represents the intensity I along an axis AA' cutting an original image 10A as shown in FIG. 3B;

FIG. 5B is a histogram of an original image 2A;

FIG. 5C is a diagram showing the sub-steps of the formation of the boundary line;

FIG. 5D shows a averaging sub-step;

DESCRIPTION OF THE PREFERRED EMBODIMENTS

THE METHOD

The image processing method to be described hereafter relates to the automatic detection of suspect opacities in a digitized mammographic image, with the object of forming an aid to the practitioner's diagnosis, without utilizing a databank, with only the data of the examined image.

Figure 2A:
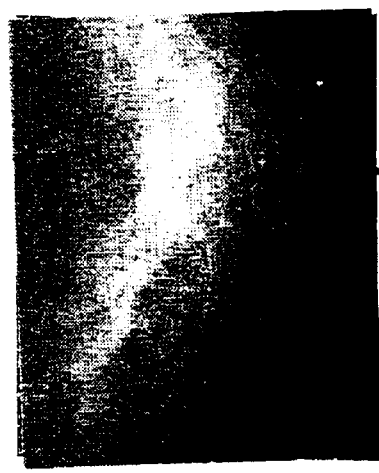
FIGS. 2A to 2F represent the intensity images obtained in different steps of the method in CHAIN A.
Figure 3A:
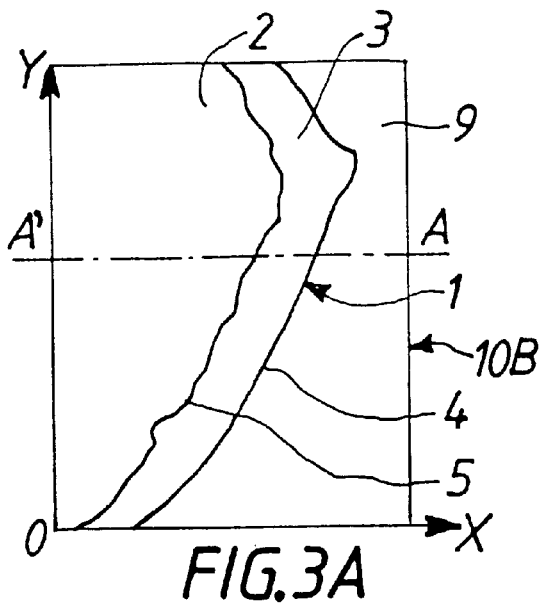
FIG. 3A shows a boundary line between breast periphery and deep breast.

FIG. 2A represents an example of such an original mammographic image 10A in the form of an intensity image. FIG. 3A represents a mammographic image in the diagrammatic manner in 10B.

The digitized mammographic image 10A can contain 1024×1024 pixels, for example, coded in 16 bits. In this coding, 12 bits are used for coding the intensity of the pixels. Mammographic images may be acquired in digitized form, but in all the cases, the invention does not take account of the method by which the digital image has been obtained.

Figure 2B:
Figure 2C:
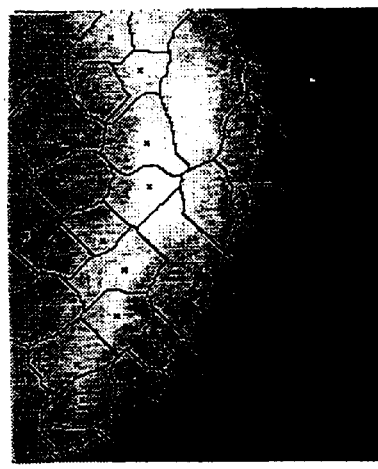
Figure 2D:
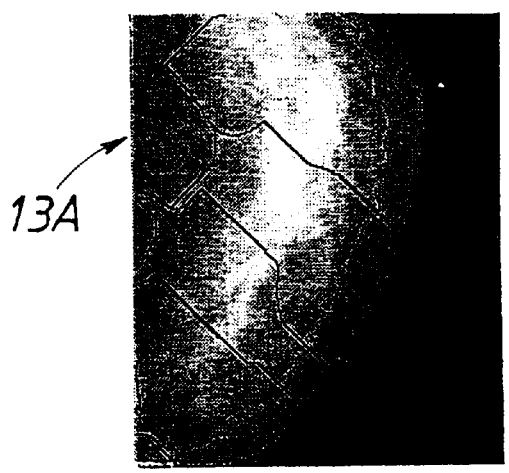
Figure 2F:
Figure 3B:
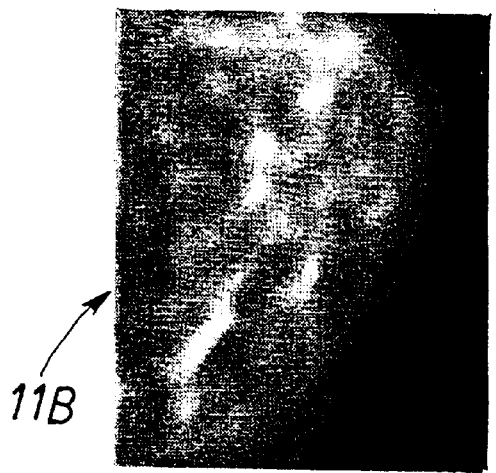
FIGS. 3B to 3F represent the intensity images obtained at different steps of the method in CHAIN B.
Figure 3C:
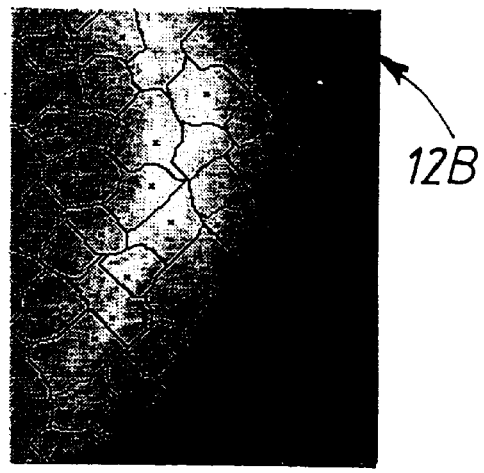
Figure 3D:
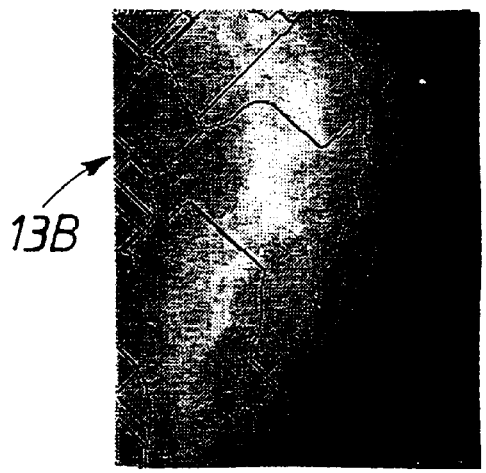

When detecting suspect opacities, a certain number of difficulties linked with the mammographic image are to be taken into account. These difficulties are of several magnitudes:

the breast organ 1 is X-rayed in profile and does not have a constant thickness. With reference to the diagrammatic representation 10B of FIG. 3A it has two zones: one called "deep breast 2" has the most constant thickness, because the practitioner takes the photograph by pressing the organ between two plates to obtain a "tissue layer" having surfaces which are as much parallel as possible; the other zone called "breast periphery 3" has a thickness which reduces rapidly, because it corresponds to the part of the "tissue layer" situated between the deep breast 2 and air;

the breast organ 1 appears in the intensity image 10A of FIG. 2A as the zone with many grey levels which stands out in black field 9, completely without information signals around the breast, where the X-rays are transmitted directly to the image processing system. The skin 4 constitutes the interface between breast 1 and the black field 9, the objects to be detected, for example, designated by crosses in FIG. 2F and FIG. 3F are opacities resulting from the existence of compact groups of coagulated biological cells. These opacities are thus shown as clear or whitish regions against the background formed by other objects of the X-rayed breast 1. These opacities have, in essence, variable locations in the breast 1 and may occur at any location both in the deep breast 2 and in the breast periphery 3. These opacities themselves further have, in essence, variable forms: their forms vary from one patient to the other and for one and the same patient their forms vary from one period to another. Generally, these forms are neither foreseeable nor repetitive. These opacities are distinguished by a woollier form from suspect anomalies which may appear in the mammography and which are called microcalcifications, the background against which these suspect opacities are to be detected is also formed by opacities which are more or less clear or whitish, which result from the ordinary texture of the breast organ 1. This ordinary texture comprises fibers, accumulations of fat and blood vessels. These objects forming the background also have forms and locations as well as intensities which are, in essence, variable, the objects of the background may easily shield the suspect opacities. The X-ray photograph indeed integrates, in principle, the information signals contained in the superimposed tissues situated in the "tissue layer". The greyish accumulations often have forms and intensities which may lead to an error in the detection of suspect opacities, the suspect opacities to be detected are potential cancers. The method is thus to take into account all the information of the image, first of all because the suspect opacities are largely interdependent of the background objects, and secondly because no possibility is to be left aside a priori, one of the aims of the method being the detection of all the potential cancers, the interdependence of the objects in the mammogram implies that the method cannot include extraction steps in the sense in which they occur in the field of image processing, the method has for its object to be self-sufficient and thus takes into account all the information signals contained in a particular image to be studied and not the information signals further contained in a database, the method seeks to detect opacities of 4 to 5 mm in diameter which correspond to starting cancers which are impalpable and invisible to ultrasonics.

The invention proposes a digital image processing method of which the various steps are illustrated in the form of function blocks by the diagrams of FIGS. 1A, 1B, FIG. 4A, FIG. 4B and FIG. 5C.

Figure 1A:
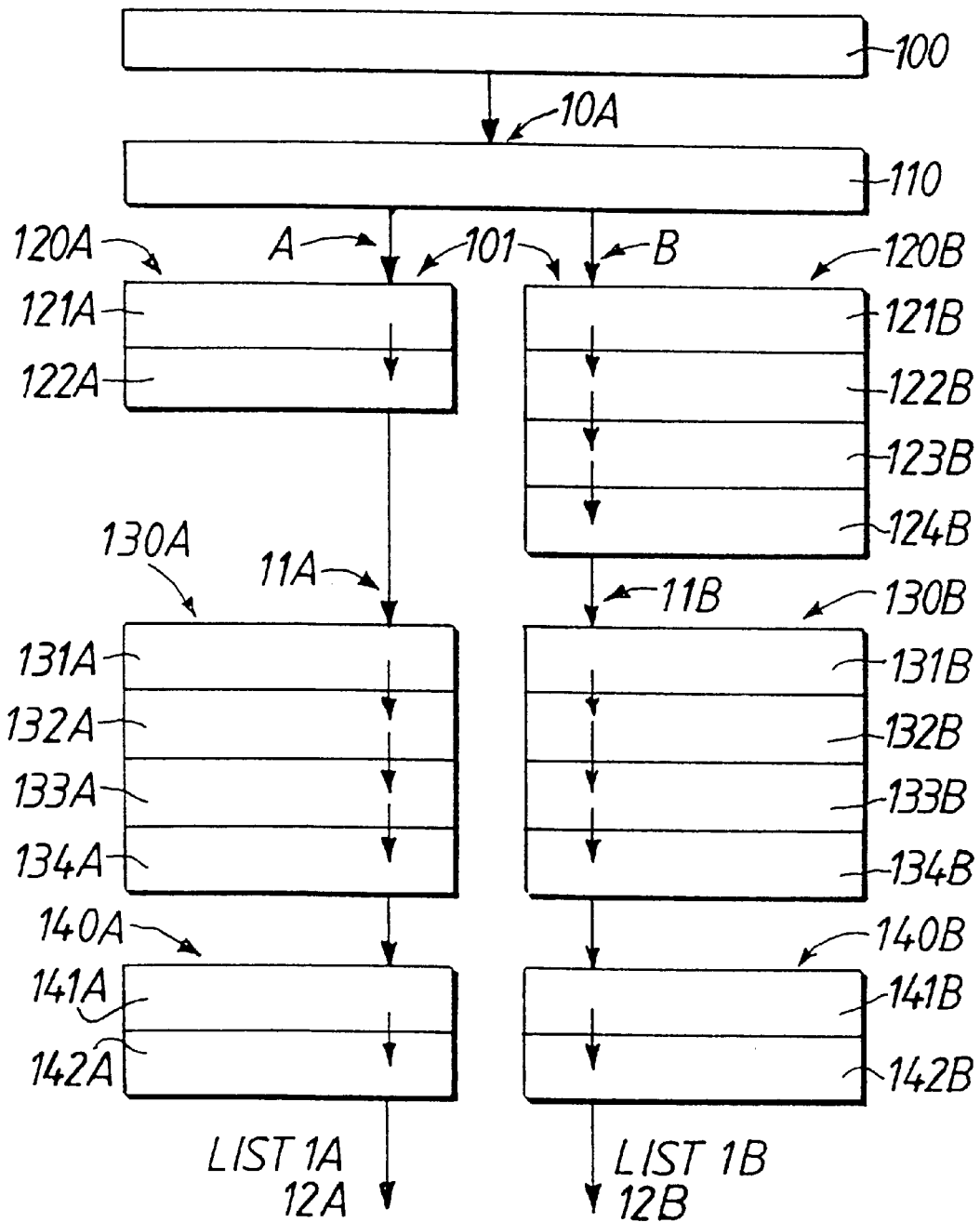
FIG. 1A is a diagram of a FIRST CYCLE of method steps.

With reference to FIG. 1A, this method comprises:
- at 100, the acquisition in digital form of an intensity image called original image 10A, as shown in FIG. 2A,
- at 110, the path of a boundary line separating the deep breast 2 from the breast periphery 3 as shown in the image 10B of the diagram of FIG. 3A,
- then a chain of steps which may take two forms, that is, chain A and chain B which may be properly led in one or the other of its forms A or B, or preferably, which may be properly led by utilizing the two forms A and B in parallel.

Each of the forms A and B of the chain comprises first of all a first cycle 101 including, with reference to FIG. 1A and FIG. 2 for the chain A, and FIG. 3 for the chain B:
- a first transformation 120A, 120B applied to the original image 10A, which smoothes for the first time the resolution of the objects to be detected, to produce an image called first transformed image 11A, 11B; this first transformation is performed, for example, by an operator having a core of a dimension of the order of the dimension of the objects to be detected;
- a first detection 130A, 130B of the major elements of the image based on the first transformed image 11A, 11B, which major elements are:
  - the position of the local intensity maximums in the first transformed image 11A, 11B,
  - the range, in a number of pixels, of the watershed regions which have induced these local maximums respectively,
  - the position of the boundaries between these various watershed regions,
- a first test 140A, 140B for eliminating non-relevant elements detected among the essential elements, which produces at the output a first list of key elements relating to chain A, denoted LIST1A, and/or a first list of key elements relating to chain B, denoted LIST1B, each of these lists comprising, respectively:
  - the range of the retained watershed region keys,
  - the position of the corresponding key maximums,
  - the boundaries of the corresponding watershed regions.

At this stage, each of the chains further produces an image 12A, 12B respectively, formed by the original image 10A in each of the chains A, B, on which the information signals relating to the first corresponding list LIST1A, LIST1B are superimposed, in order to make these elements visible. For example, the key maximums are designated by crosses and the boundaries are designated by lines.

Figure 1B:
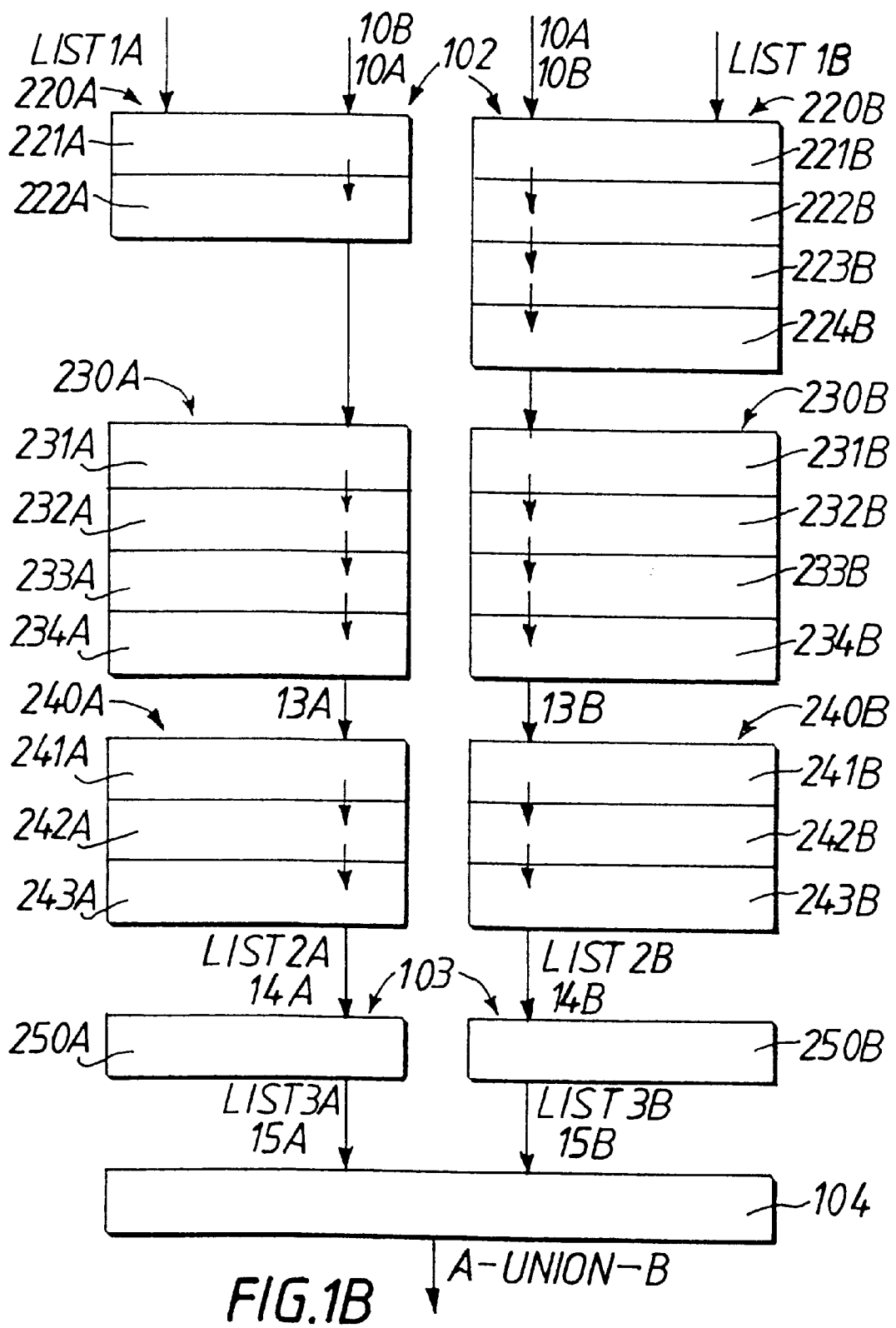
FIG. 1B is a diagram of a SECOND CYCLE of method steps.

The method is proceeded with in either one of the two chains A and B respectively, by a second step cycle 102 including, with reference to FIG. 1B:
- a second transformation 220A, 220B applied to the original image 10A, in each of the chains, which performs a second smoothing to the resolution of the tissues, to produce an image called second transformed image 13A, 13B; this second transformation can be effected by an operator which has a core of a dimension at least of the order of twice the dimension of the objects to be detected;
- a second detection 230A, 230B of the essential elements of the second transformed image, which produces:
  - the position of local intensity maximums in this second transformed image 13A, 13B,
  - the range in number of pixels of the watershed regions which have induced these new local maximums,
  - the position of the new boundaries which mark off these new watersheds shown in this second transformed image 13A, 13B,
- a comparing operation 240A, 240B for comparing intensity key maximums, performed in a local fashion and including:
  - taking account of elements of the first list LIST1A and/or LIST1B formed in the first cycle 101, to place the key maximums determined in the first cycle 101 and produced by these first lists in the new watershed regions found in the second cycle 102,
  - a comparison of the intensities of these key maximums made inside each new watershed region called homogeneous region,
  - a selection in each homogeneous region formed by a new watershed region found in the second cycle 102 of a key maximum found in the first cycle 101 as the one having the larger intensity, called better key maximum.

These local comparisons of the intensity and the selections of a better key maximum per homogeneous region cause a modification of the first lists LIST1A and/or LIST1B and form second, corresponding lists LIST2A and/or LIST2B which comprise:
- locating the better key maximums selected in this second cycle, but coming from the first lists,
- the range of the corresponding watershed regions which range comes from the first lists
- the position of the corresponding boundaries also coming from the first lists.

Figure 2E:
Figure 3E:
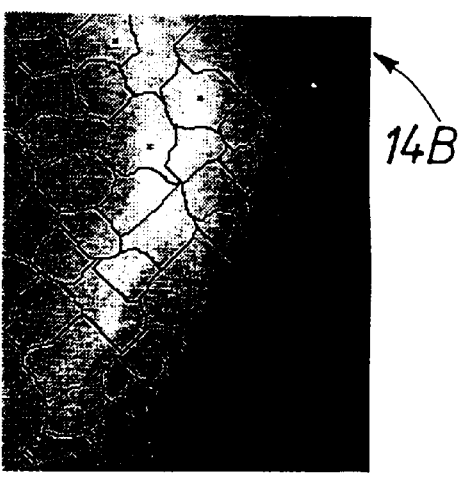
Figure 3F:
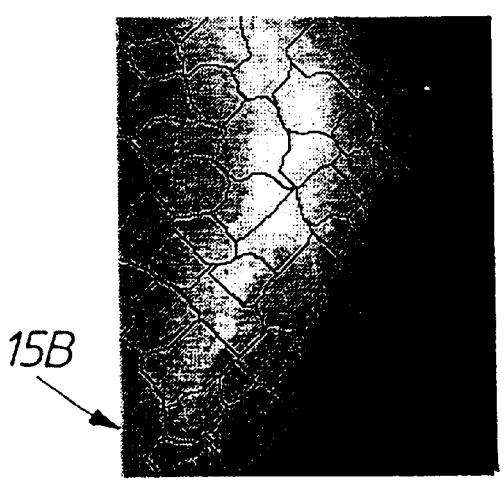

These information signals are shown in the original image and produce the images 14A, 14B of the FIGS. 2E and 3E. Furthermore, in each list the best key maximums are classified in an order of decreasing intensity.

On the basis of each second list LIST2A and/or LIST2B, the method comprises a step 103 realized in each of the chains A and B and 250A, 250B, where the operator may select from the better key maximums a certain number of "alarms" or suspect opacities also classified as a function of their probable importance. At this stage of the method one disposes of either a third list corresponding to that of the chain A or B which one has selected to use, or two third lists in the case where the two chains A and B are used in parallel, each third list being formed from the position of the intensity maximums corresponding to these alarms selected by the operator. Each chain A, B further produces an intensity image 15A, 15B constituted by the original image 10A on which the information signals relating to the third lists and formed by the selected alarms and the corresponding boundaries of the watershed regions of the first list are visibly superimposed.

According to the invention, based on the two third lists LIST3A and LIST3B, in the preferred case where the two chains A and B are used in parallel, in step 104 an additional list denoted A-UNION-B, which comprises the combination of the selected "alarms" of the lists LIST3A and LIST3B is made.

Thus the operator has a fourth list A-UNION-B in which the alarms or suspect opacities are classified as a function of their intensity response and thus of the probability they form of true potential cancer alarms.

The various steps of the method and their sub-steps will be described hereafter in detail.

I/ METHOD OF DETERMINING A BOUNDARY LINE BETWEEN THE DEEP BREAST AND BREAST PERIPHERY (110)

In order to take the difficulties linked with the variability of the image into consideration, the present method permits of processing separately the region of the deep breast 2, and the region of the breast periphery 3, by generating a boundary line 5 between these two regions by the following method 110.

This boundary line 5 is determined on the basis of the data of the original image 10A, and is diagrammatically shown in the image 10B of FIG. 3A.

As this has already been observed, with reference to FIG. 3A, the breast organ in the conditions of in-profile photography, between plates, is thicker in its deep breast part 2 than in the part of its breast periphery 3. In FIG. 3A the deep breast is represented to the left at 2. Going from left to right in this Figure along axis A'A, one successively finds the deep breast 2, the breast periphery 3, the skin 4, and the zone 9 without information. FIG. 5A represents a curve of intensities I found along the section A'A of FIG. 3A. First one finds, when starting from A'A, a high and stable intensity I (or grey level) on average, corresponding to the deep breast 2, then the intensity I rapidly diminishes in accordance with the breast periphery 3, to finally arrive at A in the intensity zone 9 which generally has little intensity. The region 2 is the whitest and thus shows intensity I the most strongly in the original image 10A of FIG. 2A, because its larger thickness transmits a less large intensity of X-rays than the peripheral region 3 which is less thick. In a general way, the greater the thickness of the tissues traversed by the X-ray, the less transparent these tissues are, thus the weaker the intensity of the transmitted X-rays is, and the more whitish the corresponding region of the mammography is.

The original image 10A, formed by pixels which have each an intensity level in the above-defined intensity level scale, will now be considered. It appears that a certain number N of image pixels corresponds to each intensity level G.

Based on this image, a histogram is formed as is represented in FIG. 5B, where the intensity levels G are shown along the X axis, for example, from the intensity level 400, to the intensity level of about 4,000; and where the number of pixels N corresponding to each intensity level G is represented along the Y axis.

This histogram reveals a region that corresponds to the zone 9 of FIG. 3A, a region of deep breast 2 and a region of breast periphery 3.

The region of zone 9 forms a peak in the histogram around the intensity level 500, because the zone 9 contains numerous pixels which have all practically the same low intensity I.

The zone of its periphery 3 forms a plateau on either side of the grey level 900, which plateau begins with a small slope running to the higher intensity levels, because in the zone of the breast periphery 3, which has a small surface in the mammography, there are few pixels which corresponds to the same intensity level, and because in the ensemble, the intensity levels of this peripheral region 3 are low, because the thickness traversed in 3 is small and thus transparent enough to X-rays. The intensity levels of this peripheral region 3 are, however, less small than those in zone 9.

The zone of deep breast 2 forms a dome beyond a certain intensity level GF which one seeks to determine; this zone 2 shows generally high intensity levels and a large number of pixels per intensity level.

The zone of the deep breast 2 is thus characterized by the presence of many pixels per intensity level; and the zone of the breast periphery 3 by the presence of few pixels per intensity level.

For determining the boundary line 5 between the deep breast and the breast periphery, one chooses to determine the position of point F of the histogram, where the slope of this histogram covered in the direction of the increasing intensity level G is maximum; and the corresponding intensity level GF is calculated.

It has been established that the curve of the histogram in the region 2 is not smooth and may show a peak 8 which indicates a second maximum of the slope, which, however, need not be taken into consideration. The present method only takes into consideration the position of the first maximum met in the histogram in the direction of rising intensity levels, and beyond the peak due to zone 9.

The boundary line 5 is then drawn on the original image 10A as a line of equal intensity which joins the pixels having the intensity GF found at this first slope maximum in the histogram.

In FIG. 5C the method 110 is represented in the form of a function block diagram. This method of determining the boundary line 5 comprises:

at 111, forming the histogram from the number of pixels N as a function of the intensity levels G of the original image 10A, at 112, smoothing this histogram to diminish the noise; this smoothing may be realized by an averaging filter of, for example, 11 pixels, which calculates for the histogram curve the number of pixels to be assigned to an intensity level $G_o$ given on axis G of the intensity levels; with reference to FIG. 5D in the example shown, this filter produces the average value between the number N' of pixels at $G_o-5$, the number N" of pixels at $G_o+5$ and the number $N_o$ of pixels at $G_o$, at 113, forming an image gradient of the histogram by calculating the derivative of the histogram function by means of a gradient filter which is an operator that evaluates the difference between the number of pixels relating to the consecutive intensity levels taken two by two, at 114, determining the largest gradients by a first test applied to the previous gradient image, to determine the slope maximums of the histogram, at 115, selecting the sought maximum F from the previously determined maximums at 114 by utilizing, for example, the second following test: the value of the slope maximum is maintained if the intensity level GF corresponds to a value of the cumulated sum of the number of pixels $\Sigma(N)$, between G=400 and GF, which is lower than 50% of the total cumulated sum of the number of pixels $\Sigma(N)$ between, in our example, the intensity level G=400 and the intensity level=4,000. This test allows of the selection of the first maximum at F in FIG. 5B, at 116, forming a line 5 which connects neighboring pixels in the original image 10A, having the intensity level GF in this image as is shown in the diagram in image 10B of FIG. 3A. According to the conventions of the present method, this line 5 separates the region of the deep breast 2 from the region of the breast periphery 3.

At the end of the step 100 for acquiring the digitized image, and step 110 for determining the boundary line 5, the present method comprises thus at least one chain and preferably two chains of steps A and B respectively, processing the original image 10A of FIG. 2A in parallel, containing information signals represented in image 10B of FIG. 3A.

II/ FIRST FORM OF THE PROCESSING CHAIN: CHAIN A

II-1 First Cycle of Chain A

The first cycle (101) has for an object to establish a first list LIST1A, LIST1B of essential key elements of the image, to reveal the opacities to be detected.

The various steps of the first cycle 101 of the present method are represented in detail in the form of function blocks in the diagram of FIG. 1A.

a) First Transformation 120A (121A, 122A) of the Original Image

The first chain of steps of the method denoted chain A, comprises first of all in this first cycle a linear transformation 120A applied to the original image 10A, to produce a transformed image, denoted first transformed image of chain A, such as is represented by the intensity image 11A in FIG. 2B. This linear transformation 120A is intended to smooth the original image 10A to the resolution of the objects to be detected, to represent the objects at the scale of the suspect opacities sought.

Figure 7A:
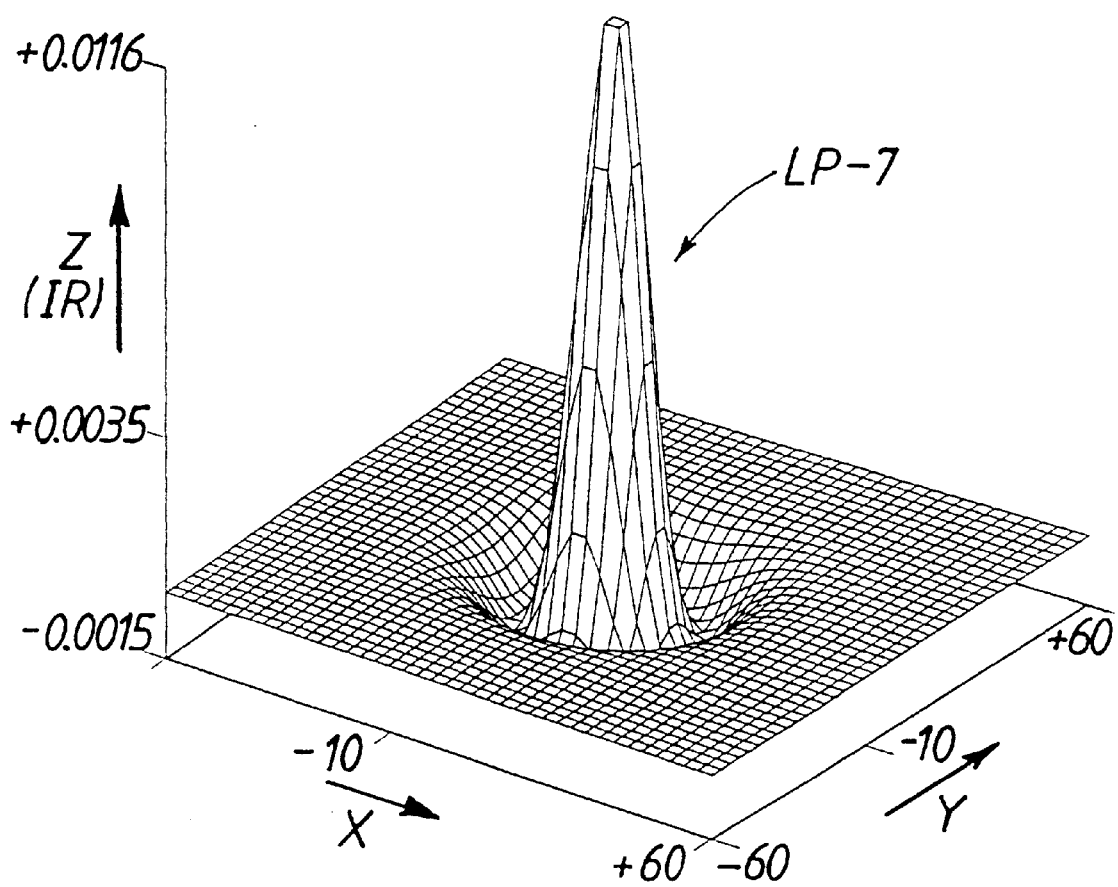
FIGS. 7A to 7F show the intensity responses IR as a function of pixel distances in the processed image, these distances being counted along two rectangular axes X, Y.

This linear transformation step 120A itself comprises two sub-steps.

a1) an isotropic band pass filtering 121A of the original image 10A by a two-dimensional recursive Laplacian filter, of mean resolution, denoted LP-7; the width of the Laplacian core is, for example, σ=7 pixels; by width σ of the core of a filter one generally understands half the height of the intensity peak of a Gaussian or Laplacian operator, for example, with which the image to be processed is convoluted to obtain the result of the filtering; such an intensity peak corresponds, in the case of the filtering 121A, to the impulse response of the filter LP-7 which is represented in a diagrammatic manner in FIG. 7A; this FIG. 7A shows the intensity response IR along the Z-axis in a system of coordinates X, Y, Z; the distance relative to the current pixel positioned at X=o and Y=o is counted in pixels on the axes X, Y which run parallel with the plane of the processed image.

a2) A sign inversion 122A of the pixel intensities: actually, the result of the convolution of the original image by a filter having a Laplacian core is an image where the zone containing the sought opacities have an inverse intensity level compared with the original image. Thus, for maintaining the same aspect of whitish "opacities" in the intensity image during the whole image processing method, the sign of the intensities is inverted after the Laplacian filter LP-7 has been passed through.

This linear transformation including this mean-resolution Laplacian-core filter shows the local overdensities, without distinguishing the origin of these overdensities; this is to say that, in addition to the suspect opacities, other zones including, for example, superimposed fibers or vessels can be developed.

b) Detection of the Essential elements in the First Transformed Image by a Method 130A of the Local Maximums Image 11A is considered, which is the result of the previous linear transformation 120A as a landscape, of which two dimensions called horizontals are measured along the axes of coordinates X, Y of a matrix reference of the pixels of this image 11A, and of which the third dimension called vertical dimension is formed by the scale of the intensity levels Z of each of the pixels of said image 11A. The coordinate axes may be the axes X, Y, Z shown by way of example in the diagrammatic image 10B in FIG. 3A.

The object of this step is to define the transformed image 11A by three groups of major elements.

To this effect one considers that this landscape image comprises three groups of geographical elements:

peaks which would geographically correspond to the highest points of the landscape, for example, to mountain tops, watershed regions of which the slope lines converge to respective peaks, boundaries between the various watershed regions, which would geographically correspond to the lines connecting the lowest points of the valleys or tops between the watershed regions.

By putting the geographical tops in the same category as the local intensity maximums, one tries to detect in this step:

the local intensity maximums, the corresponding watershed regions, the boundaries between the watershed regions.

These elements will be called major elements of the first transformed image. For this purpose, this detection step comprises various sub-steps:

b1) Calculation of the Gradient Image of the First Transformed Image

In this sub-step 131A, the intensity gradients are calculated for each pixel of the first transformed image 11A to determine the slopes of the intensity image landscape. This sub-step 131A forms an image called gradient image. The image of the gradients is obtained, for example, by a band pass filtering oriented to both axes defined in the two-dimensional pixel matrix. This filtering is equivalent to applying, for example, a low-pass Gaussian filtering to the transformed image, followed by the filtering by a first order differential operator oriented to the axes of the matrix, which produces, as is known to those skilled in the art, the partial intensity derivatives $\partial/\partial x + \partial/\partial y$.

b2) Putting Dots 132A on the Landscape Image

A dot is fictitiously placed at each pixel of the landscape image 11A, and by a forced displacement, each dot is caused to follow TO THE TOP the direction of the slope calculated previously for this pixel. All the fictitiously positioned dots, at the rate of 1 per pixel, are caused to converge to various respective peaks, determining in this manner the first essential elements sought:

the local intensity maximums in the landscape image.

b3) Counting the Dots 133A

During the step 132A of putting dots on the landscape image, the number S of dots converging to the same peak are counted 133A, and the position of the initial pixel of each dot is determined. This sub-step 133A produces in this manner the second essential elements sought:

the range, in number of pixels, of the watershed regions corresponding to each peak or maximum local intensity in the landscape image.

b4) Determining in 134A Pairs of Adjacent Pixels Sharing Different Watershed Regions This sub-step produces the third major elements of the landscape image which are:

the boundaries between the various watershed regions.

From the preceding step 133A is known the original location of the dots that have converged to a first peak, and that of the dots that have converged to a second adjacent peak. Thus, the location of the corresponding pixels is known. In 134A are determined from these pixels pairs of adjacent pixels of which one is the origin of a dot that has converged to the first peak, and of which the other one originates from a dot that has converged to the second peak.

The boundary between the two adjacent watershed regions that correspond to these peaks is defined as a line which passes through these pairs of adjacent pixels.

The operation is repeated until boundaries are obtained which completely surround each peak while the zone they mark off comprises the number of pixels corresponding to the range of the corresponding watershed region.

For reasons of simplicity, in lieu of having the boundary run between the adjacent pixels of the pairs that have been determined, this boundary is made to pass by one of these two pixels.

Thus, this method of the local maximums makes it possible to determine all the major image elements in a simple and rapid manner.

c) Selection of Key Elements by a Test 140A

In order not to run the risk of extracting a small suspect zone involuntarily, the present method does not substantially contain pure extraction steps as are understood in the field of image processing.

Nevertheless, there has been decided to detect as suspect opacities only the opacities of which the diameter is larger than or equal to 4 mm. This choice has been confirmed on the medical level by a team of practitioners who base themselves on a large number of examined cases. It has appeared that in this verification of the present method by these practitioners, 100% of the objects not retained by the present method were false alarms.

Thus, the major elements retained in the present method will henceforth be denoted "key elements".

In principle, these key elements are retained, among the previous selected major elements, as those which are imposed by the range of the corresponding watershed region.

Thus the following key elements of the image are selected:

the watershed regions having ranges of, for example, >600 pixels, the corresponding peaks, the corresponding boundaries.

These key elements are stored in the form of a list called LIST1A. The peaks or intensity maximums are classified in each list in a decreasing order of intensity.

The intensity image 12A obtained at the start of this processing, such as shown in FIG. 2C, is formed by the original image 10A on which are visibly superimposed the information signals relating to the key elements:

the key element peaks are represented by crosses: they are intensity maximums, the watershed regions are marked off by the boundaries represented by lines around the crosses.

II.2 Second Cycle of Chain A

Figure 4A:
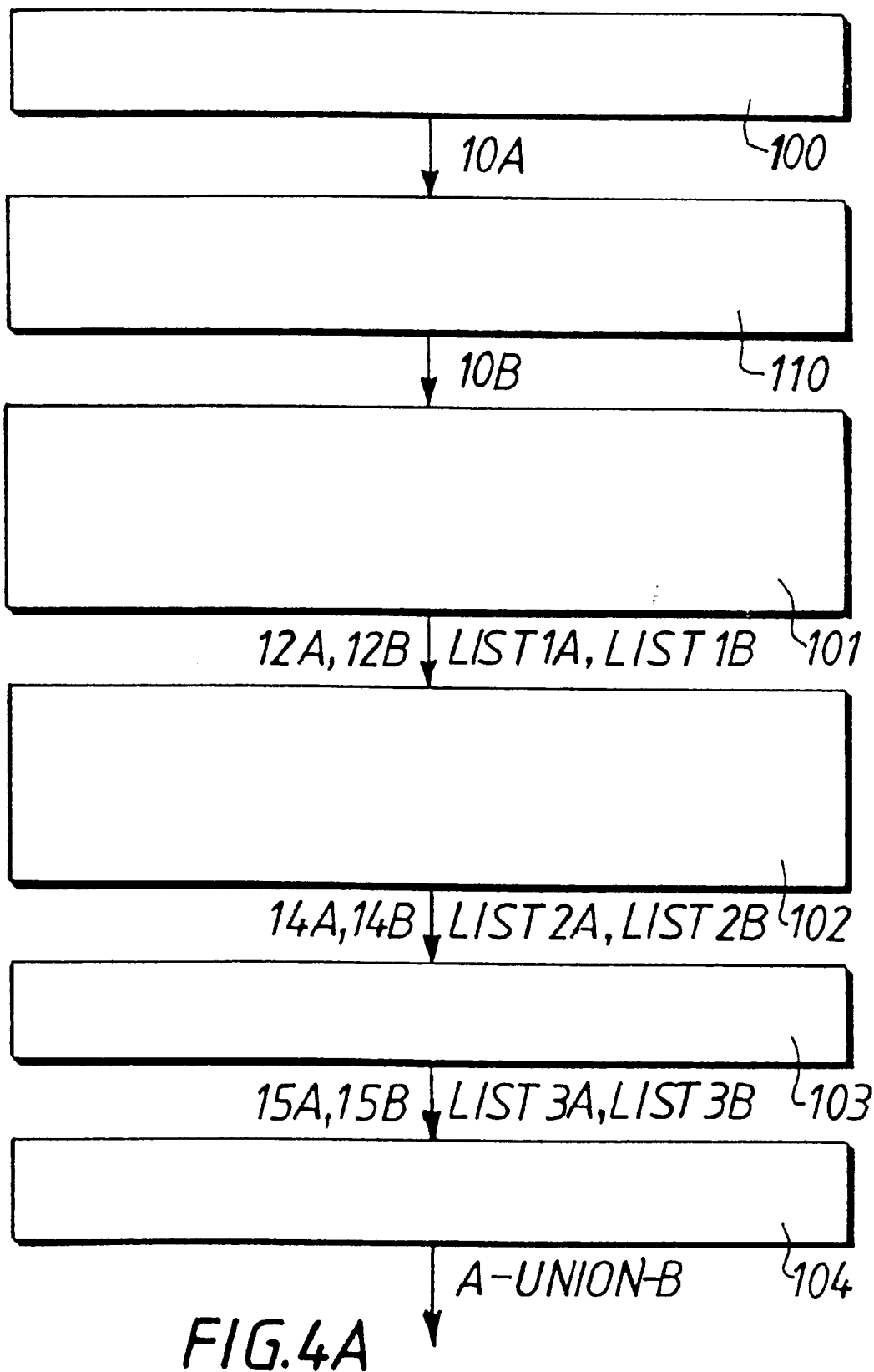
FIG. 4A is a general diagram of the method.
Figure 4B:
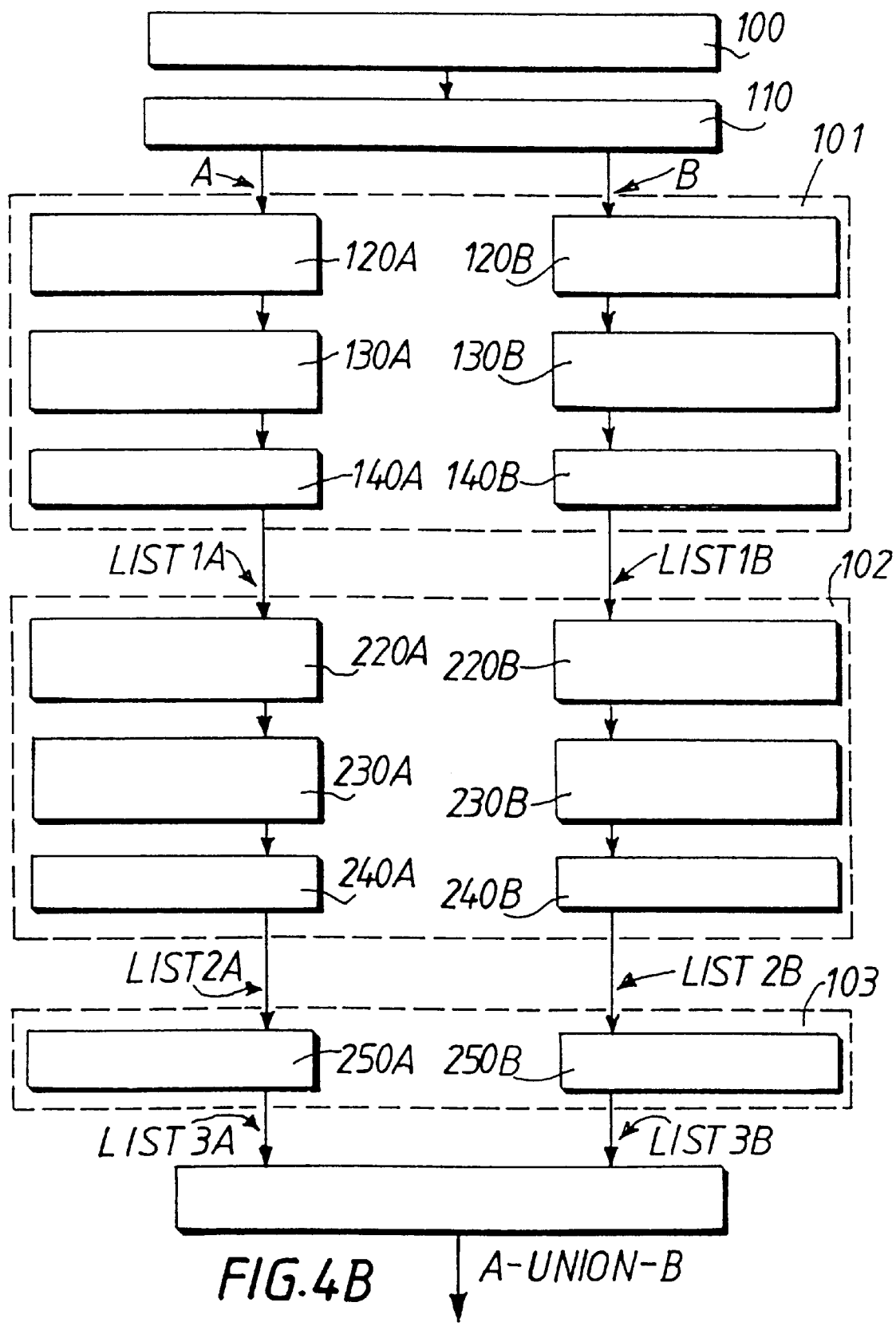
FIG. 4B is a general diagram of the method showing the various CYCLES and the CHAIN A and CHAIN B, FIG. 5 show the formation step of a boundary line between breast periphery and deep breast.

With reference to FIGS. 1B and 4B, this second cycle has for an object to establish a second list LIST2A which contains the best major elements designated as key elements selected and retained via a second cycle of steps to be described hereafter.

The steps of the second cycle of this first chain A prolong those of the first cycle at the end of the test operation 140A.

a) Second Transformation 220A (221A, 222A)

This second transformation 220A is a linear transformation just like in the first cycle. It is applied to the original image 10A of FIG. 2A to smooth this image 10A, no longer to the resolution of the objects, but to the resolution of the diffuse tissues contained in the breast organ to generate homogeneous regions in this image 10A.

This linear transformation step 220A has two sub-steps 221A, 222A carried out exactly as the two sub-steps 121A, 122A in the first cycle, except for the fact that the Laplacian filter is referenced LP-15; this filter has a core width $\sigma \approx 15$ pixels, for example. This resolution is much lower than the width of the Laplacian core used in this chain A during the first cycle, which makes it possible to smooth the image much more and to make the sought homogeneous regions thus appear in the image; the impulse response of the filter LP-15 is shown diagrammatically in FIG. 7D.

b) Detection of the Watershed Regions of the Image Produced by the Second Transformation 220A, by the Method 230A of the Local Maximums Exactly the same method of the local maximums described previously in the first cycle of chain A is applied to the smoothed image resulting from the second transformation 220A.

This method yields:

new peaks which will not be taken into account, which are used only for determining new watershed regions, new watershed regions corresponding to these new peaks, which will be stored because these new watershed regions constitute, as a result of a smoothing of the low-resolution image, homogeneous regions which will be used in a later step, new boundaries limiting the new watershed regions which are represented by lines around these homogeneous regions in image 13A of FIG. 2D.

c) Local Comparison 240A of the Key Maximums and Selection of the Best Key Maximums The key maximums of the first list LIST1A are placed in the homogeneous regions formed by the new watershed regions found in the preceding step.

In each homogeneous region formed by the new watershed regions, the key maximums are classified according to a decreasing order of intensity.

This local comparison of the maximums is based on the principle that the presence of true suspect opacities considered locally is to be robust, because of their physical existence in the diffuse tissues.

By making this local comparison of the maximums, one has the advantage of being able to take the depth into account. In effect, opacities having similar aspects in the original image do not give the same response during the processing, depending on whether they originally have a suspect opacity and a glandular tissue.

It is interesting to note that according to the present method each NEW WATERSHED REGION forms TWO watershed regions and not ONE if it is divided into two by the boundary line 5 determined above by method 110. The key maximums are thus replaced in these two watershed regions called SEPARATE, because one part belongs to the breast periphery 3 and another part to the deep breast 2. The key maximums of each of these parts 2 and 3 are classified separately in a decreasing order of intensity.

This step 240A makes it possible to form a second list LIST2A of the chain A.

In each new watershed region, a single one of the key maximums is retained: the key maximum having the largest intensity is maintained. The best key maximums are visibly marked by crosses.

A list of the best key maximums constituting the second list LIST2A is then formed.

At the end of this step, the image 14A of FIG. 2E formed by the supplied original image 10A, is obtained in visible manner from information signals which have just been determined:

the best key maximums of the list LIST2A the key watershed regions of list LIST1A the key boundaries of the list LIST1A
the boundary line 5 between the deep breast and the breast periphery.

SECOND FORM OF THE PROCESSING CHAIN: CHAIN B

III.1 First Cycle of the Chain B a) First Transformation 120B (121B, 122B, 123B, 124B) of the Original Image The second chain of steps of the method denoted chain B also comprises in this first cycle a transformation of the original image 10A, but now this transformation 120B is a non-linear transformation.. This transformation produces a transformed image denoted first transformed image of the chain B such as represented by the intensity image 11B of FIG. 3B.

This non-linear transformation 120B is to perform a smoothing of the original image 10A to the resolution of the objects to be detected, to make the objects at the scale of the suspect opacities to be detected stand out.

Figure 7B:
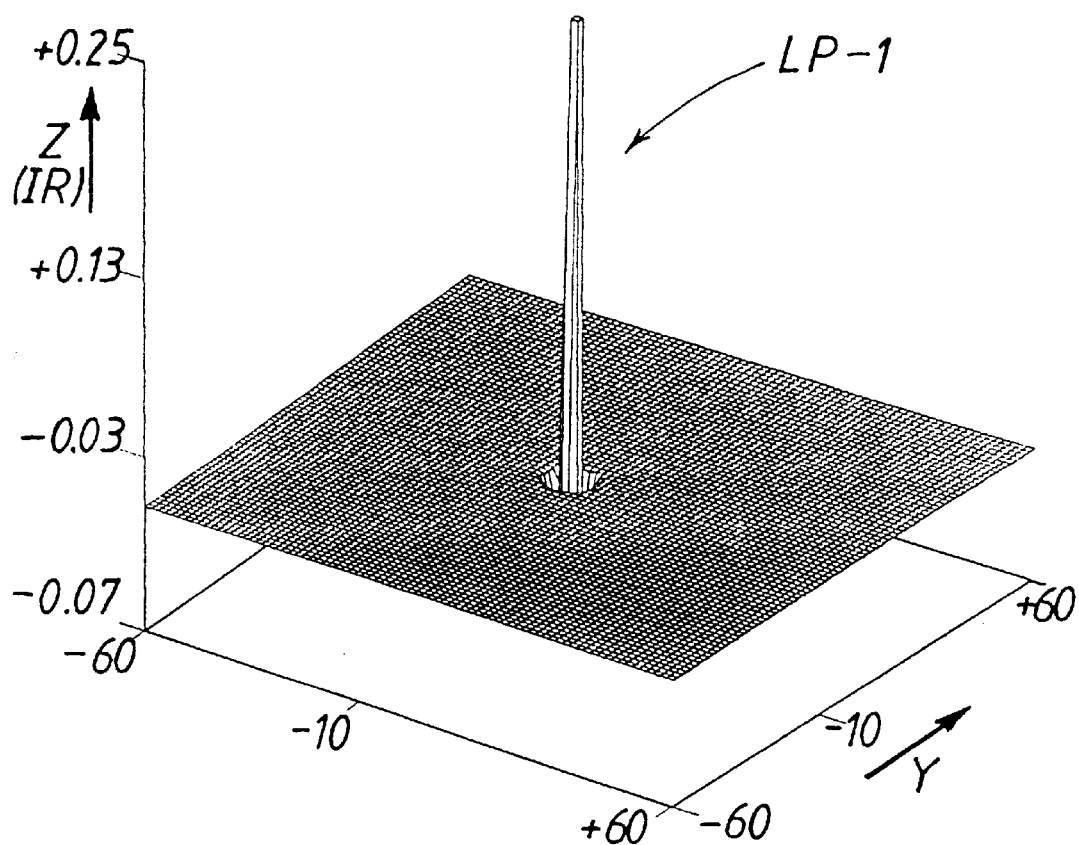

The original image contains, as has already been observed, greyish masses, fibers, vessels which cause local overdensities due to the thickness and to the non-transparency to X-rays of these tissues. It appears that these three types of objects are not as differentiated as would be desirable if one only uses the filtering by a Laplacian filter as in the chain A of the method. Therefore, in this chain B, a more complex transformation of the original image is performed. This first transformation comprises the following sub-steps illustrated by the diagram of FIG. 1A:

a1) an isotropic band pass filtering 121B of the original image 10A by a recursive two-dimensional Laplacian filter with a high resolution denoted LP-1; the width of the core of the Laplacian filter is, for example, σ=1 pixel; the impulse response of the filter is illustrated diagrammatically by FIG. 7B.

In this sub-step, the fibers and the vessels give a strong amplitude response to this Laplacian filter, whereas the opaque objects give a response of the same sign, but less strong. There are also image zones which give a response of opposite sign.

a2) An operation 122B of sign inversion of the intensities of the pixels which is similar to the operation 122A a2) made in chain A.

a3) A test operation 123B in which the intensity of the zones, whose intensity was negative after the sign inversion, is set to zero: they are the zones which had given the response of the sign opposite to that of the response of the fibers and opacities. These zones, which are set to zero, now form a background for the objects to be selected.

Figure 7C:
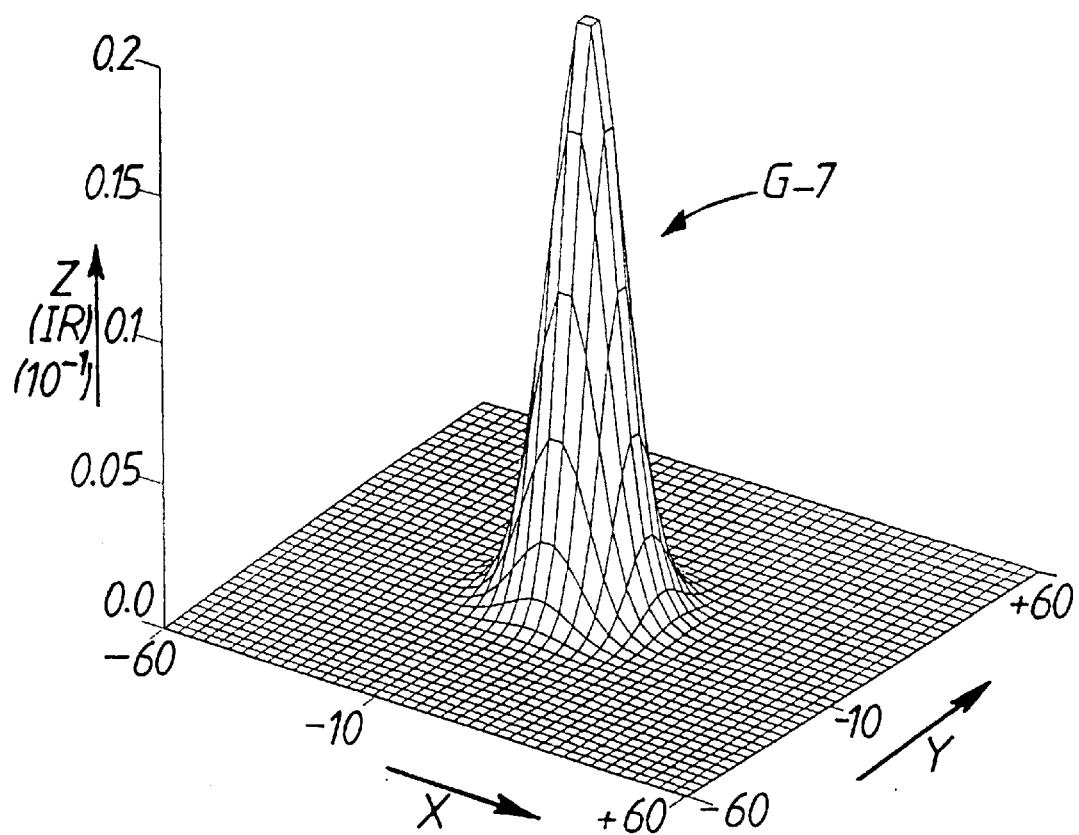
Figure 7D:
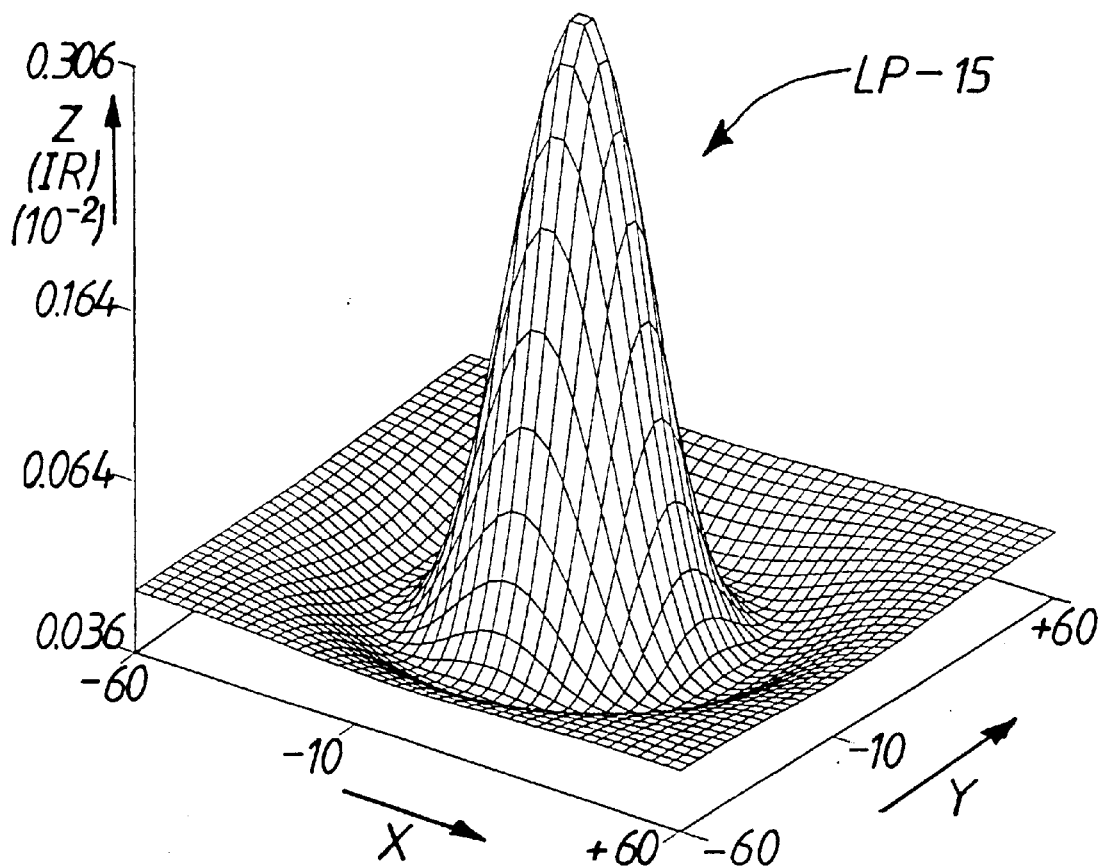

Only the parts of the image showing a positive response are maintained, and among them, in addition to the opacities, the vessels which show a strong amplitude response, but only have a small range.

a4) A smoothing 124B by means of an isotropic low-pass filtering by a recursive two-dimensional filter having a Gaussian core G7 at a resolution of the order of the objects to be detected, for example, σ=7. With this operation, an average value is found between background and the objects having a positive intensity amplitude. The response of this filter G7 is shown diagrammatically by way of example in FIG. 7C.

As a result of this average value, since the background is set to zero, the small vessels, which have a small range, are then attenuated, because their response to this Gaussian filtering is very low. As opposed to this, the opaque objects, which have a large range, give a strong amplitude response to this Gaussian filtering and are now revealed.

The importance of utilizing in this chain B a succession of operators in lieu of a single linear Laplacian operator as in the chain A, which operators form a nonlinear transformation for realizing this transformation of the original image, is that different objects are revealed.

The image obtained by this non-linear transformation 120B is an intensity image 11B such as is represented in FIG. 3B.

This chain B is continued based on this first transformed image 11B with the operations 130B and 140B which are exactly identical to the operations 130A and 140A of the chain A described previously, with the exception of:

the selection of the key watershed regions in operation 140B is made with a smaller test than in the operation 140A, for example, 500 pixels in this chain B in lieu of 600 pixels in chain A, a list LIST1B of the key elements is formed at the start of the test operation 140B, but this list does not of necessity contain exactly the same objects as LIST1A resulting from the operation 140A of chain A, because the transformation 120B is different from the transformation 120A.

Thus, the image obtained when the selection of the key elements is started, is image 12B of FIG. 3C, obtained from the original image 10A on which are visibly superimposed the information signals relating to the new key elements:

peaks referenced by crosses, watershed regions surrounding the peaks, boundaries designated by lines which may be different from the key elements shown in the image 13B in 3D.

At this stage of the method, the images 12B still comprise too many elements to enable the practitioner to make his diagnosis. Among these major elements, there are some elements which are certainly not relevant. The next step of the present method makes it possible to eliminate these substantially irrelevant elements.

III.2 Second Cycle of the Chain B

The steps of the second cycle of this second chain B prolong those of the first cycle at the end of the test operation 140B.

a) Second Transformation 220B (221B, 222B, 223B, 224B)

This second transformation 220B is a non-linear transformation just like the first transformation 120B of the first cycle. It is applied to the original image 10A of FIG. 3B to effect, as in chain A, a smoothing of this image 10A to the resolution of the tissues to make homogeneous regions stand out in this image 10A.

Figure 7E:
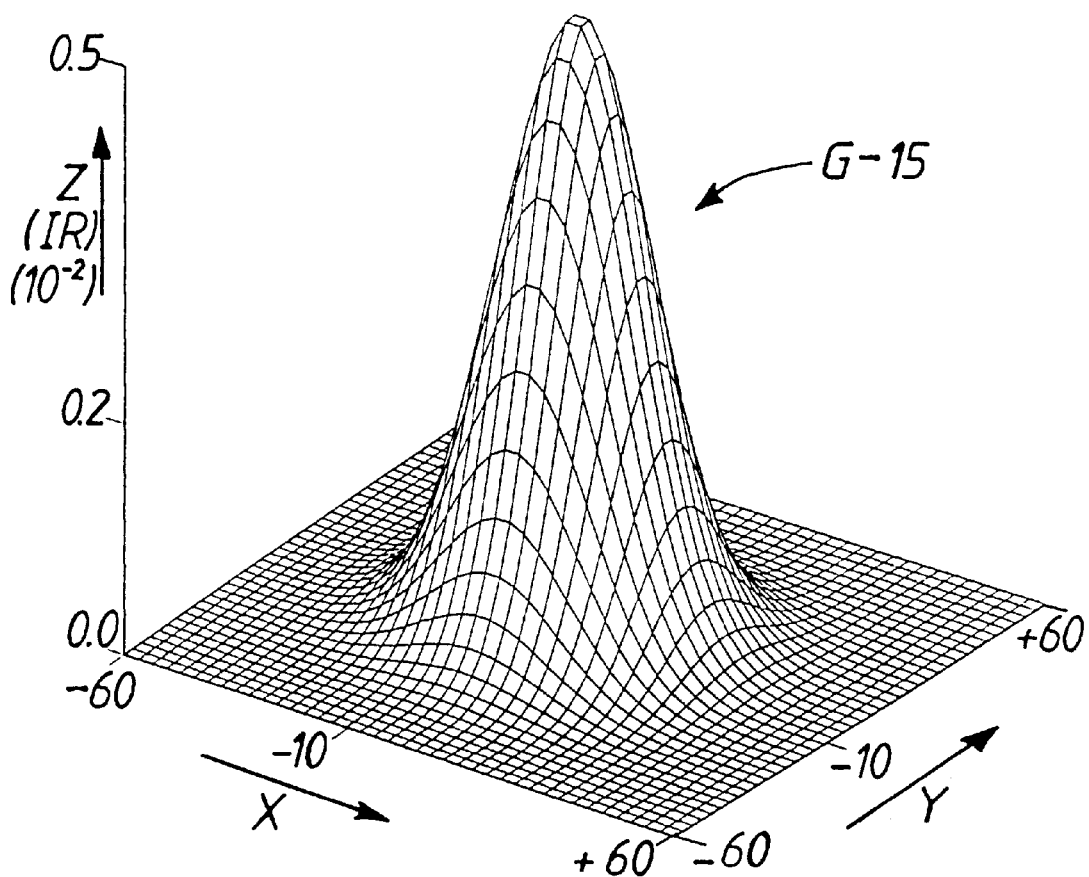

This non-linear transformation step comprises four sub-steps 221B, 222B, 223B, 224B, effected exactly like the four sub-steps 121B, 122B, 123B and 124B of the first cycle, except that the Gaussian filter is referenced G15 and has a resolution σ=15 pixels. This resolution is much lower than the resolution of the Gaussian filter used in the first cycle, so as to better smooth the image and make homogeneous intensity zones appear in this manner. The response of the Gaussian core filter G15 is shown diagrammatically by way of example in FIG. 7E. It should be observed that the sub-step 221B, made just like the sub-step 121B, also uses a two-dimensional recursive Laplacian filter with a core width of σ=1, whose impulse response is shown diagrammatically in FIG. 7B.

Figure 7F:
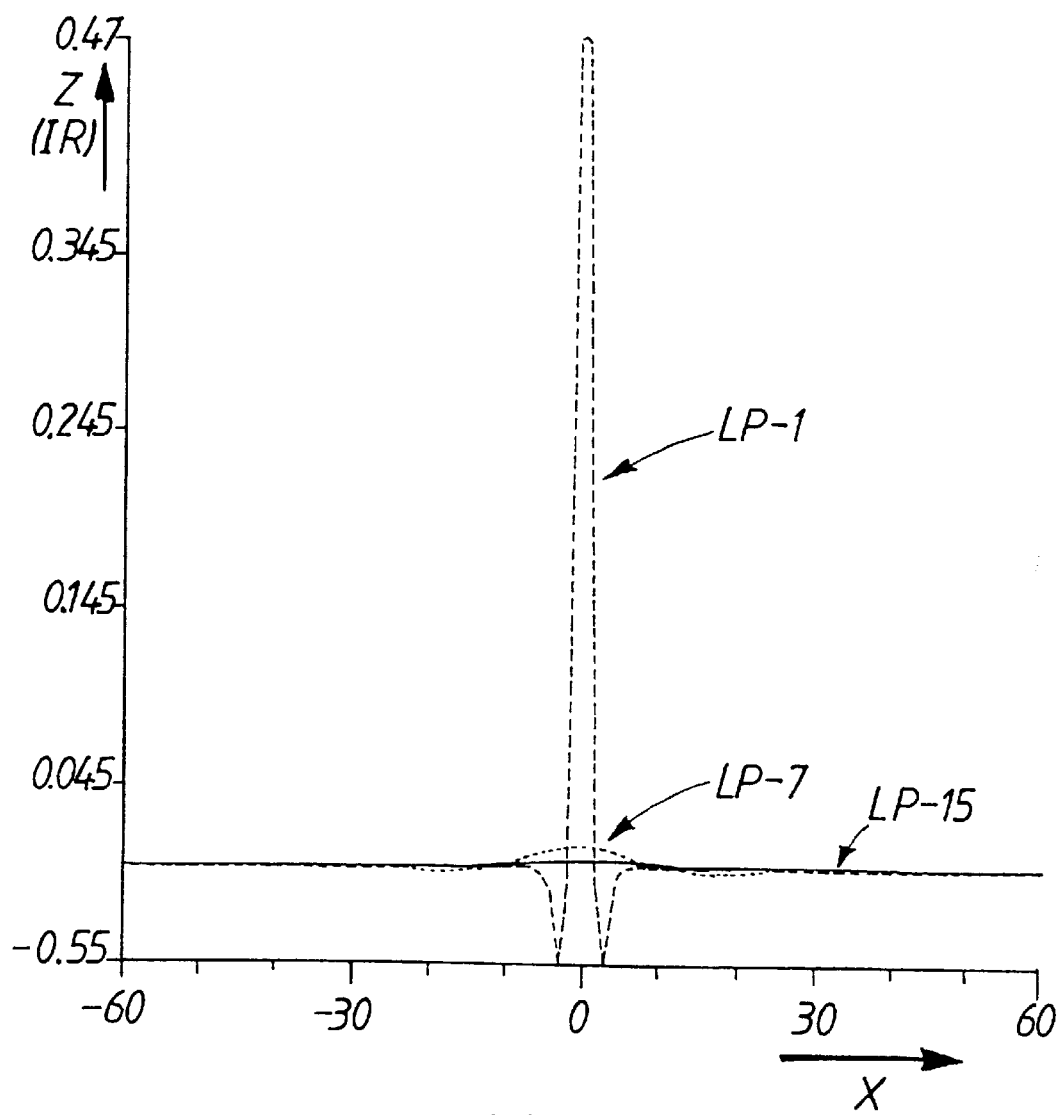

FIG. 7F shows at the same scale in the plane of the axes X, Z, the impulse responses of the Laplacian filters used in the method. This FIG. 7F shows how the choice of a given filter may make an image element stand out or be smoothed.

b) Detection of the Watershed Regions of the Image Produced by the Second Transformation 220B, by the Method of the Local Maximums 230B Applied in the Same Manner as in the First Chain A of this Second Cycle c) Local Comparison 240B of the Key Maximums and Selection of the Best Key Maximums This operation is conducted in exactly the same manner in this chain B as in the chain A, described previously.

This step constitutes the final step of chain B and is intended to form furthermore a second list LIST2B of the chain B.

In each watershed region, a single one of the key maximums is maintained: the key maximum having the largest intensity represented by a cross is maintained.

A list of the best key maximums which constitute the second list LIST2B is formed in this manner. At the end of this step the image having intensity 14B of FIG. 3E is obtained, on which the following elements are marked in a visible manner:

the best key maximums, the key watershed regions of LIST1B, the key boundaries of LIST1B represented by lines, the boundary line 5 between the deep breast and the breast periphery.

CHOICE OF ALARMS AND VALIDATION OF THE METHOD

With reference to the diagrams of FIGS. 1B, 4A and 4B, the operator defines in step 103 at the end of each of the chains A and B respectively, at 250A and 250 B, the third lists LIST3A and LIST3B which contain each a certain number of the best key maximums of the LIST2A and LIST2B respectively. The LIST3A and LIST3B thus only maintain the maximums called "alarms" which have the largest intensities.

The number of guard alarms is left up to the operator. The method maintains alarms both in the deep breast and in the breast periphery.

The fact that the method renders the search for these alarms in the two parts of the breast different is very important, for a region comprising both a deep part of the breast and a peripheral part of the breast can never be considered a homogeneous region suitable for the local comparison of the intensities of the maximums.

Preferably, the method utilizes the chains A and B in parallel. In this case, at this level of embodying the chains A and B, the method finally realizes in step 104 the combination of the alarms A-UNION-B, as discussed previously. It clearly appears, by comparing the intensity images 15A and 15B, on which the alarms are marked by crosses, that the chain A and the chain B do not exactly detect the same alarms. Consequently, the combination of the alarms realized according to the method improves the detection of suspect opacities and thus the detection of potential cancers.

The method has been tested with 245 mammographies previously interpreted by a group of practitioners. According to the interpretation of these practitioners, these mammographies contained a total of 256 suspect opacities verified by biopsies, which thus had to be detected by the present method.

Figure 6:
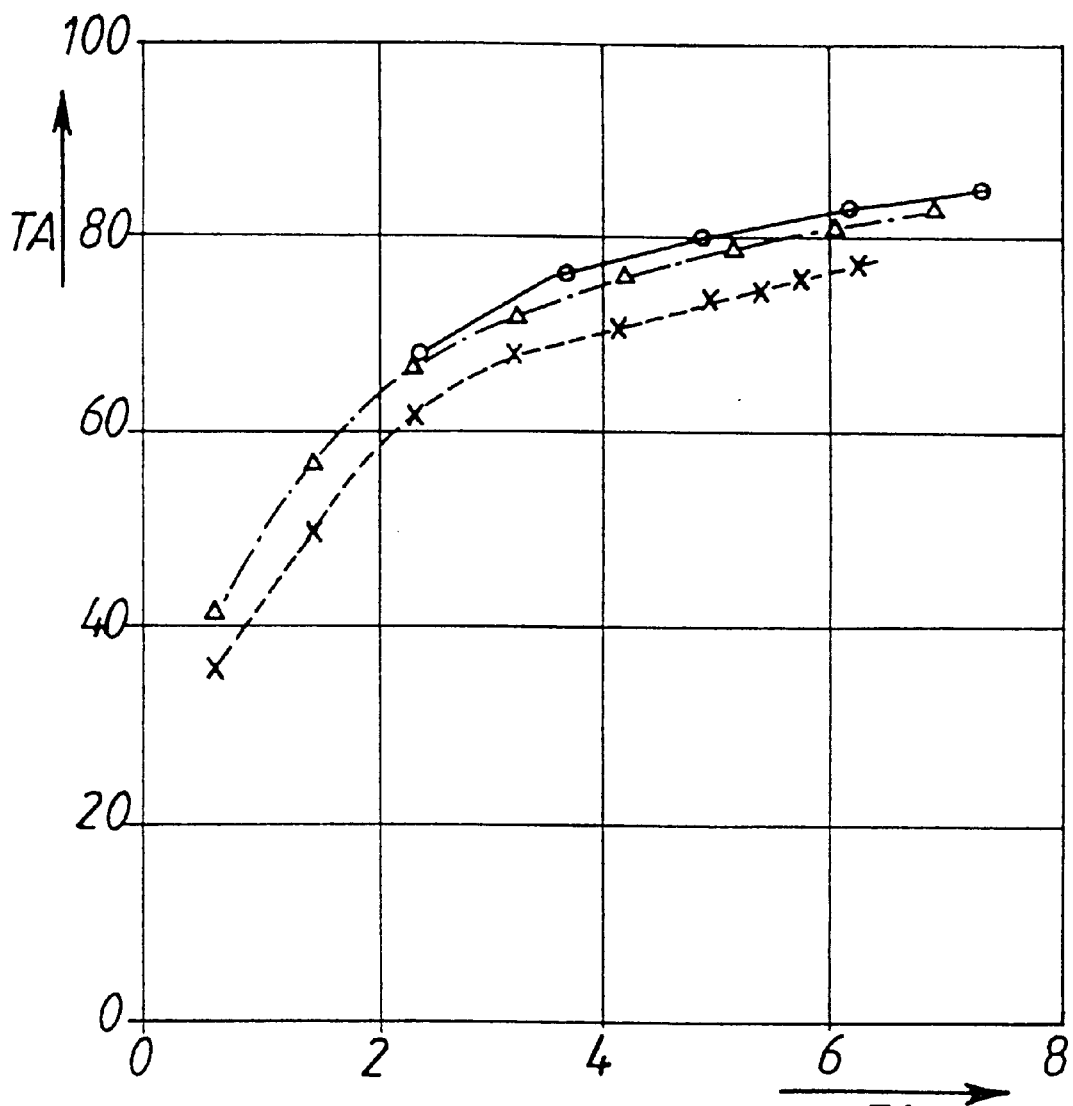
FIG. 6 shows the results obtained with the method in curves showing the true alarms TA as a function of false alarms FA.

The examination of these mammographies has permitted to establish a curve ROC represented in FIG. 6 (Receiver Operating Curve), which shows along the X axis the falsely detected number of alarms FA (false alarms) and along the Y axis the number of properly detected true alarms TA.

An ideal curve ROC would be that which would show vertically from the origin to 100% of true alarms, with 0% of false alarms. In that case 100% of the cancers would be detected without any error.

The present automatic method makes it possible to approach this ideal to a large extent. In the curve ROC of FIG. 6 the dashed line connecting the crosses represents the number of true alarms TA detected relative to the false alarms FA by only chain A (linear transformations); the dash-and-dot line connecting the triangles represents the number of true alarms TA detected relative to the false alarms PA by only chain B (non-linear transformations). The solid line connecting the circles represents the number of true alarms TA detected relative to the false alarms FA by means of A-UNION-B.

Notably, by means of A-UNION-B it has been possible to detect:

80% of true alarms TA (real cancers) for 4 false alarms FA (erroneously suspected cancers), which makes 200 automatically resolved cases out of the 245 proposed cases, 70% of true alarms (real cancers) for 2 false alarms FA (erroneously suspected cancers), which makes 180 automatically resolved cases out of 245 proposed cases.

The more the operator or the practitioner accepts to take false alarms into account, the more he approaches the 100% of resolved cases.

The chains A and B of the present method are not only variants to be utilized, because utilizing them in parallel makes it possible to obtain an improved result.

In effect, with reference to the curve ROC of FIG. 6 one finds that, for example, for the same number of 5 false alarms:

the chain A makes it possible to detect 76% of the true alarms, chain B makes it possible to detect 83% of true alarms and A-UNION-B makes it possible to detect 86% of true alarms.

In a variant of the method, in lieu of applying in the second cycle the linear transformations 220A and non-linear transformations 220B to the original image 10A, one may advantageously apply the transformation to either of the first transformed images 11A, 11B obtained in the first cycle.

The method described above in its application to mammographic image processing may be advantageously applied to the detection of objects of a given type in any digital image that represents diffuse objects. More particularly, this method may be applied to digitized radiographies, of other parts of the human body or animal body.

THE DEVICE

Figure 8:
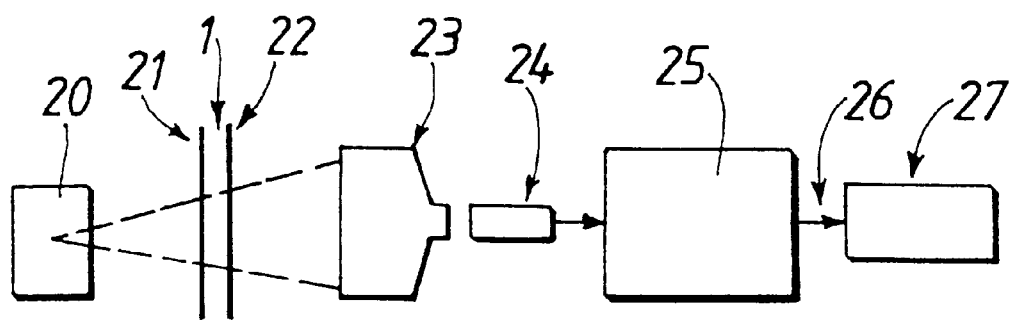
FIG. 8 shows in a diagram a device for taking and processing X-ray images, including a microprocessor associated with a computer for processing image data in accordance with the present method.

With reference to FIG. 8, a digitized radiography system comprises an X-ray source 20 or other radiation source, plates 21, 22 for pressing the breast organ 1 of the patient onto the radiographer, an image intensifier 23 coupled to a picture tube 24, which supplies data to a digital image processing system 25 connected to a microprocessor. The latter has various outputs of which one output 26 is coupled to a monitor 27 for displaying the radiographic image or the intensity image.

With reference to the diagrams of FIGS. 1A, 4A, 4B, the digital image produced by the system 25 is stored in storage means 100 in the form of data which are accessible via the microprocessor (not shown). The latter, connected to a computer terminal (not shown), processes the data stored in 100 according to the described present image processing method to produce intensity images which contain visual marks (crosses for the intensity maximums, and lines bounding the corresponding suspect regions) like these of the images 15A and 15B of FIGS. 2F and 3F, and to produce the intensity values linked with the indicated alarms, classified in diminishing order forming the sought list A-UNION-B.

These images, formed by the original image coming from the visual indications which mark the alarms and the boundaries of the corresponding watershed regions are displayed on a screen under the control of the computer, or can be printed out in another embodiment.

The digitized image processing system is not restricted to processing mammograms, but may be applied to the processing of any other image that poses similar problems.

I claim:

1. A method of image processing for automatically detecting objects of a given type among diffuse objects in an image called original image in the form of a two-dimensional pixel matrix which has digitized intensity values, this method comprising, in the form of a processing chain, steps which include:

a first transformation of the original image comprising a bandpass filtering to the resolution of the objects to be detected, to produce a first transformed image, determining local intensity maxima based on said first transformed image whose associated watershed regions have at least a predetermined size, a second transformation of the original image comprising a bandpass filtering to the resolution of diffuse objects, to produce a second transformed image, determining watershed regions in the second transformed image, placing the local intensity maxima determined on the basis of the first transformed image, in the watershed regions in the second transformed image, and selecting one of these maxima per watershed region, and forming a list of objects among the selected intensity maxima, which constitutes a list of the objects of a given type detected in the original image.

2. Method as claimed in claim 1, according to which the two-dimensional matrix is associated to orthogonal axes, and according to which the processing chain has a first form called first chain, in which:

the first transformed image is obtained by a linear transformation including an isotropic band pass filtering with a core ($\sigma$) of the order of the dimension of the objects to be detected, the second transformed image is obtained by a linear transformation including an isotropic band pass filtering with a core ($\sigma$) of the order of the dimension of the diffuse objects.

3. Method as claimed in claim 1, according to which the two-dimensional matrix is associated to orthogonal axes, and according to which the processing chain has a second form called second chain in which:

the first transformed image is obtained by a non-linear transformation including an isotropic band pass filtering with a core of the order of the dimension of the pixel, followed by an isotropic low pass filtering with a core of the order of the dimension of the objects to be detected, the second transformed image is obtained by a non-linear transformation including an isotropic band pass filtering with a core of the order of the dimension of the pixel, followed by an isotropic low pass filtering with a core ($\sigma$) of the order of the dimension of the diffuse objects.

4. Image processing method as claimed in claim 2, comprising, besides the first chain, a second form of the processing chain, called second chain, in which:

the first transformed image is obtained by a non-linear filtering including an isotropic band pass filtering with a core of the order of the dimension of the pixel, followed by an isotropic low pass filtering with a core of the order of the dimension of the objects to be detected, the second transformed image is obtained by a non-linear filtering including an isotropic band pass filtering with a core of the order of the dimension of the pixel, followed by an isotropic low pass filtering with a core ($\sigma$) of the order of the dimension of the diffuse objects.

5. Method as claimed in claim 4, according to which in either chain:

determining the local maxima includes the formation, based on the first transformed image, of a first intensity gradient image obtained by a band pass filtering oriented along the said axes of the two-dimensional matrix, followed by a "placing of fictitious dots" at a rate of one per pixel, forced to follow the slopes of the first intensity gradient image to determine the points of convergence of the slopes as local maxima, determining watershed regions includes the formation, based on the second transformed image, of a second intensity gradient image obtained by a band pass filtering oriented along the said axes of the two-dimensional matrix, followed by a "placing of fictitious dots" at a rate of one per pixel, forced to follow the slopes of the second intensity gradient image to determine the points of convergence of the slopes, the counting of the fictitious dots which converge towards each of these points to determine the range and number of pixels of the corresponding regions, and determining adjacent pixels that belong to different regions as boundaries of these regions called watershed regions.

6. Method as claimed in claim 5, according to which the detected lists of objects formed from the selection of the maxima in the first and second chains are called respectively, list of the first chain and list of the second chain, method further comprising a combining step for combining the list of the first chain and the list of the second chain forming a better list of the detected objects.

7. Method as claimed in claim 4, according to which, in the first chain, for producing the first transformed image of said first chain, the isotropic band pass filtering is effected by a recursive two-dimensional filtering with a Laplacian core of $\sigma=7$ pixels, for producing the second transformed image of said first chain, the isotropic band pass filtering is effected by a recursive two-dimensional filtering having a Laplacian core of $\sigma=15$ pixels, and according to which, in the second chain, for producing the first transformed image of said second chain, the isotropic band pass filtering is effected by a recursive two-dimensional filtering having a Laplacian core of $\sigma=1$ pixel, and the isotropic low-pass filtering is effected by a recursive two-dimensional filtering having a Gaussian core of $\sigma=7$ pixels, for producing the second transformed image of said second chain, the isotropic band pass filtering is effected by a recursive two-dimensional filtering having a Laplacian core of $\sigma=1$ pixel, and the isotropic low-pass filtering is effected by a recursive two-dimensional filtering having a Gaussian core of $\sigma=15$ pixels.

8. Method as claimed in claim 1, applied to an image acquired by a transmission through a region of a body and comprising a preliminary forming step for forming a boundary line between a zone of the image that corresponds to a part of the region of the body that has a substantially constant thickness, and an adjacent zone of the image that corresponds to another part of the region of the body that has a non-constant thickness.

9. Method as claimed in claim 8, according to which in the step for determining watershed regions, one potential watershed region is divided into two watershed regions when it is traversed by said boundary line, in which regions the local maxima are then placed individually.

10. Method as claimed in claim 8, comprising for the formation of the boundary line between the two zones:

the formation of a histogram from the number of pixels as a function of the intensity levels of the original image, a smoothing of this histogram, the formation of histogram gradients, the selection of the largest of the histogram gradients for determining the slope maximums in the histogram, the selection of a first slope maximum found among the previously determined maximums in the histogram, by going from regions of little opacity to regions of growing opacity.

11. Method as claimed in claim 1, comprising in the processing chain, the generation of marks for letting detected objects stand out on the original image.

12. Auxiliary method for displaying suspect biological masses, comprising the formation of an image of a region inside a human body in the form of a two-dimensional pixel matrix which has digitized intensities, the processing of this image being effected in the steps as defined in claim 1.

13. Auxiliary device for displaying medical images, comprising:

a system for producing data of a medical image of a part of the human body in the form of a two-dimensional pixel matrix which has digitized intensity values, a display system for displaying the image, and a processing system including a processor which has access to the image data and to the display system for implementing the method as claimed in claim 1.

14. Method as claimed in claim 5, according to which, in the first chain, for producing the first transformed image of said first chain, the isotropic band pass filtering is effected by a recursive two-dimensional filtering with a Laplacian core of $\sigma=7$ pixels, for producing the second transformed image of said first chain, the isotropic band pass filtering is effected by a recursive two-dimensional filtering having a Laplacian core of $\sigma=15$ pixels, and according to which, in the second chain, for producing the first transformed image of said second chain, the isotropic band pass filtering is effected by a recursive two-dimensional filtering having a Laplacian core of $\sigma=1$ pixel, and the isotropic low-pass filtering is effected by a recursive two-dimensional filtering having a Gaussian core of $\sigma=7$ pixels, for producing the second transformed image of said second chain, the isotropic band pass filtering is effected by a recursive two-dimensional filtering having a Laplacian core of $\sigma=1$ pixel, and the isotropic low-pass filtering is effected by a recursive two-dimensional filtering having a Gaussian core of $\sigma=15$ pixels.

15. Method as claimed in claim 6, according to which, in the first chain, for producing the first transformed image of said first chain, the isotropic band pass filtering is effected by a recursive two-dimensional filtering with a Laplacian core of $\sigma=7$ pixels, for producing the second transformed image of said first chain, the isotropic band pass filtering is effected by a recursive two-dimensional filtering having a Laplacian core of $\sigma=15$ pixels, and according to which, in the second chain, for producing the first transformed image of said second chain, the isotropic band pass filtering is effected by a recursive two-dimensional filtering having a Laplacian core of $\sigma=1$ pixel, and the isotropic low-pass filtering is effected by a recursive two-dimensional filtering having a Gaussian core of $\sigma=7$ pixels, for producing the second transformed image of said second chain, the isotropic band pass filtering is effected by a recursive two-dimensional filtering having a Laplacian core of $\sigma=1$ pixel, and the isotropic low-pass filtering is effected by a recursive two-dimensional filtering having a Gaussian core of $\sigma=15$ pixels.

16. Method as claimed in claim 5, according to which in either chain, for producing the first and second gradient images, the oriented band pass filtering is effected by a filtering having a low-pass Gaussian core followed by a filtering by an oriented first-order differential operator.

17. Method as claimed in claim 2, applied to an image acquired by a transmission through a region of a body and comprising a preliminary forming step for forming a boundary line between a zone of the image that corresponds to a part of the region of the body that has a substantially constant thickness, and an adjacent zone of the image that corresponds to another part of the region of the body that has a non-constant thickness.

18. The method of claim 1 wherein:

determining the local maxima comprises the formation, based on the first transformed image, of a first intensity gradient image obtained by a band pass filtering oriented along the said axes of the two-dimensional matrix, followed by a "placing of fictitious dots" at a rate of one per pixel, forced to follow the slopes of the first intensity gradient image to determine the points of convergence of the slopes as local maxima, and determining watershed regions comprises the formation, based on the second transformed image, of a second intensity gradient image obtained by a band pass filtering oriented along the said axes of the two-dimensional matrix, followed by a "placing of fictitious dots" at a rate of one per pixel, forced to follow the slopes of the second intensity gradient image to determine the points of convergence of the slopes, the counting of the fictitious dots which converge towards each of these points to determine the range and number of pixels of the corresponding regions, and determining adjacent pixels that belong to different regions as boundaries of these regions called watershed regions.

19. The method of claim 18 wherein for producing the first and second intensity gradient images, the oriented band pass filtering is effected by a filtering having a low-pass Gaussian core followed by a filtering by an oriented first-order differential operator.

20. The method of claim 1 wherein the watershed regions of predetermined size include at least 600 pixels.

* * * * *